(12) United States Patent
Shrikhande et al.

(10) Patent No.: US 8,649,679 B2
(45) Date of Patent: Feb. 11, 2014

(54) MANAGEMENT SYSTEM FOR GPON BASED SERVICES

(75) Inventors: Kapil Shrikhande, Berkeley, CA (US); Kent George McCammon, Livermore, CA (US); Kevin Xiangkai Meng, San Ramon, CA (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 634 days.

(21) Appl. No.: 12/316,641

(22) Filed: Dec. 15, 2008

(65) Prior Publication Data

US 2010/0150546 A1   Jun. 17, 2010

(51) Int. Cl.
*H04B 10/08* (2011.01)

(52) U.S. Cl.
USPC ............... 398/33; 398/10; 398/17; 398/25; 398/70; 398/71

(58) Field of Classification Search
USPC ............ 398/58–72, 13, 20, 28, 33, 34, 9, 15, 398/17, 10, 7, 14, 25, 38
See application file for complete search history.

(56) References Cited

U.S. PATENT DOCUMENTS

| | | | |
|---|---|---|---|
| 7,386,234 B2 * | 6/2008 | Lee et al. | 398/67 |
| 2008/0285449 A1 * | 11/2008 | Larsson et al. | 370/232 |
| 2009/0148157 A1 * | 6/2009 | Bernard et al. | 398/25 |

\* cited by examiner

*Primary Examiner* — M. R. Sedighian
(74) *Attorney, Agent, or Firm* — Wolff & Samson PC

(57) ABSTRACT

A computerized system and method for managing a passive optical network (PON) is disclosed. The system includes a detection and analysis module adapted for receiving uploaded measurement data from an optical line terminal (OLT) and at least one optical network terminal (ONT), and at least one of technical tools data, service failure data, and outside plant data. The detection and analysis module is adapted for determining a source of failure or potential failure in the PON by correlating the uploaded measurement data and the at least one of technical tools data and service failure data with information stored in a memory medium for the OLT and each ONT.

19 Claims, 7 Drawing Sheets

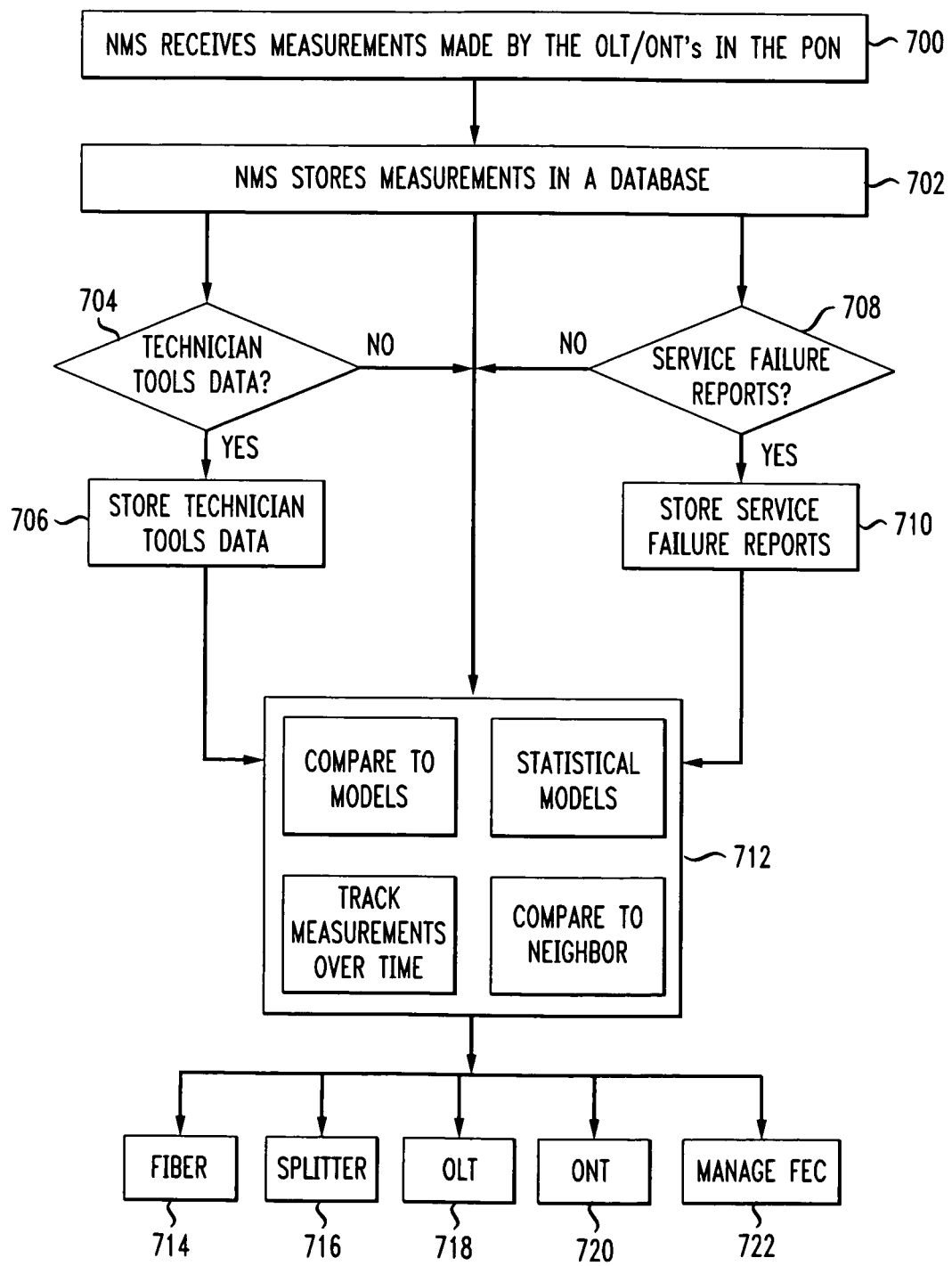

MANAGEMENT SYSTEM FOR GPON BASED SERVICES

FIELD OF THE INVENTION

The present invention relates generally to optical networking, and more particularly, to passive optical networks (PONs) and a method and system for managing PONs by correlating network data from various sources to enable comprehensive network management.

BACKGROUND OF THE INVENTION

The development of optical fiber communication technologies has enabled exponential growth in the capacity of backbone networks. PONs have been proposed as a flexible broadband infrastructure for delivering voice, video and data to homes and businesses. The most basic PON architecture consists of an optical transceiver at a central office (CO), connected via an optical fiber to a branching point containing a passive optical splitter located in the vicinity (neighborhood) of the customer, and then connected via multiple distribution fibers to transceivers at or near the homes being served. The PON architecture eliminates the requirement for optical-to-electrical-to-optical (OEO) conversion at each node of the fiber optic network by employing passive optical components such as beam splitters and filters at network nodes instead of active optical components. A PON, therefore, is cost effective when compared to active fiber optic networks, and has significant potential for such "fiber-to-the-home" applications. Although this approach has been proposed and demonstrated in the laboratory for approximately twenty years, the widespread deployment of PONs has only recently begun in the United States.

Over the past several years, the developments of several PON standards have helped pave the way for mass deployments of this technology. The two most important standards processes for PONs are being conducted through the IEEE and ITU-T, respectively. The IEEE effort is focused in the IEEE 803.3ah Ethernet in the First Mile Task Force, which is defining standards for Ethernet PONs (EPON). The ITU-T effort is fed by the Full Service Access Networks (FSAN) organization. This group of service providers and vendors has been responsible for the standardization of ATM PON (APON), Broadband PON (BPON), and Gigabit PON (GPON). Next Generation PON systems that use higher linerates and/or more wavelengths are emerging that have the same outside plant structure. Lastly, specialized PON systems for certain market segments that leverage networks build upon DOCSIS or 'Cable' PON are being deployed for fiber to the home using the same passive optical network structure and reusing protocols in the CATV networks.

Although these PONs differ in capacity, upstream bandwidth allocation, data encapsulation technology, etc., their underlying passive outside plant (also known as optical distribution network) architectures are very similar.

FIG. 1 is a schematic representation of an exemplary GPON that includes an enhancement band for delivering broadcast video services. As indicated in the FIG. 1, the architecture of a representative GPON includes a CO 100 that comprises a video optical line terminal (OLT) 102 and a data OLT 104 that communicate with a core network. The signals from OLT 102 and OLT 104 are multiplexed at 106. Downstream time-division multiplexed (TDM) data is carried in the optical band from 1480-1500 nm wavelength, upstream time-division multiple access (TDMA) data is carried in the optical band from 1260-1360 nm wavelength, and video is carried in the video enhancement band from 1550-1560 nm wavelength. The EPON bandwidth allocation standard in 802.3ah uses the same 1480-1500 nm wavelength band for downstream communication, while upstream TDMA data is carried in the optical band from 1260-1360 nm wavelength. Techniques to add capacity with additional wavelengths apply to BPON, GPON and EPON. The downstream data is communicated over an optical distribution fiber 108 to a remote node containing an optical power splitter 110 that communicates with a plurality of optical network terminals (in the example shown, ONT1-ONT32) designated by the reference numerals $112_1$-$112_{32}$. The wavelength allocation is per ITU-T G.983.3 and for such a GPON with broadcast video in the enhancement band, each ONT 112 contains a triplexer for segregating the three wavelength bands.

FIG. 2 is schematic of another exemplary GPON system where the video data is included in the downstream TDM data, thereby obviating the need for a G.983.3 enhancement band. Here, the central office 200 includes a data OLT 204 (no video OLT), that communicates via an optical distribution fiber 208 to a passive optical splitter 210 in a manner similar to that described with respect to FIG. 1. A plurality of optical network terminals (ONT1-ONT 32) designated by the reference numerals $212_1$-$212_{32}$ are likewise coupled to splitter 210 at the remote node. Considering the large downstream TDM capacity of BPON and GPON (up to 1.2 Gb/s and 2.4 Gb/s, respectively, shared among 32 users), it is possible to distribute video signals using IP packets (IPTV) over the TDM channel. In this expedient, the 1550-1560 nm enhancement band depicted in FIG. 1 is not used.

All networks, including PONs, require a level of network monitoring and management to facilitate efficient, effective and reliable operation. A Network Management System (NMS) typically employs a combination of hardware and software to monitor and administer a network. However, typical NMSs cannot address deployment specific problems and model PON protocol or transceiver behavior. Current approaches are very focused and limited in scope. For instance, fiber faults can be detected using an Optical Time Domain Reflector (OTDR), but OTDRs cannot detect OLT or ONT malfunctions. Element Management Systems (EMSs) may be utilized to monitor the OLTs and ONTs, but these are not typically designed to correlate OLT/ONT data with outside plant records, data from technician tools, or customer trouble reports.

It would therefore be desirable to provide a NMS that is specifically adapted for PON networks, which, and applies algorithms and rules to PON data received from a variety of sources to facilitate improved network management.

SUMMARY OF THE INVENTION

In accordance with an aspect of the present invention, a computerized NMS for a PON is provided. The NMS generally includes a detection and analysis module adapted for receiving uploaded measurement data from an OLT and at least one ONT, and at least one of technical tools data, service failure data, and outside plant data, the detection and analysis module further adapted for determining a source of failure or potential failure in the PON by correlating the uploaded measurement data and the at least one of technical tools data and service failure data with information stored in a memory medium for the OLT and each ONT.

The detection and analysis module may be configured to include or otherwise cooperate with a plurality of modules for comparing the uploaded measurement and technician tools data to theoretical models; grouping the measurement and technician tools data and statistically analyzing the measurement and technician tools data; collecting the measurement and technician tools data periodically and comparing the measurement and technician tools data at different sampling points; and/or comparing the measurement and technician tools data from an ONT to other ONTs connected to the OLT. A graphic user interface displays outputs from the detection and analysis module for an operator administering the PON.

In accordance with another aspect of the present invention, a computerized method is disclosed for managing a PON. The method comprises the steps of: receiving uploaded measurement data from an OLT and at least one optical network terminal ONT, and at least one of technical tools data, service failure data, and outside plant data; determining a source of failure or potential failure in the PON by correlating the uploaded measurement data and the at least one of technical tools data and service failure data with information stored in a memory medium for the OLT and each ONT; and displaying the source of failure or potential failure on a graphic user interface.

In accordance with yet another aspect of the present invention, a machine-readable medium containing computer encoded instructions thereon is provided for directing a device to implement the above methodology.

These aspects of the invention and further advantages thereof will become apparent to those skilled in the art as the present invention is described with particular reference to the accompanying drawings.

BRIEF DESCRIPTION OF THE DRAWINGS

FIG. 7 is a flowchart of a process in accordance with the present invention.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items. Although aspects of the present invention are described with respect to a GPON, it will be appreciated by those skilled in the art that the invention is applicable to all PONs, including a BPON, EPON, Docsis or Cable PON, and Next Generation PON with higher linerates and more wavelengths.

Figure 1:
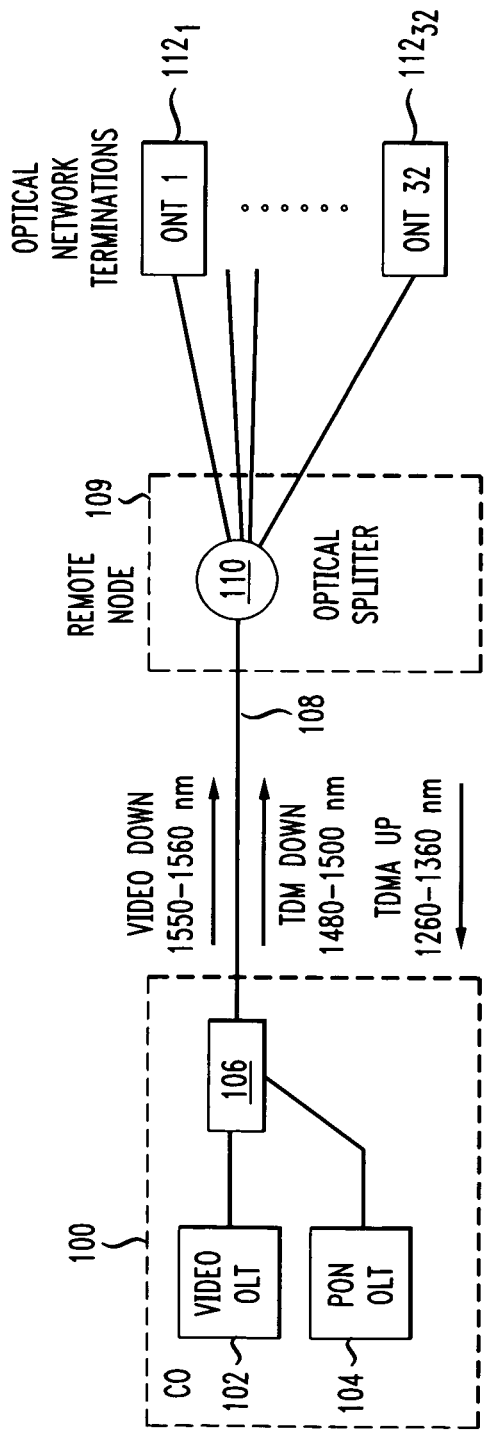
FIG. 1 is a schematic of an exemplary prior art GPON.
Figure 2:
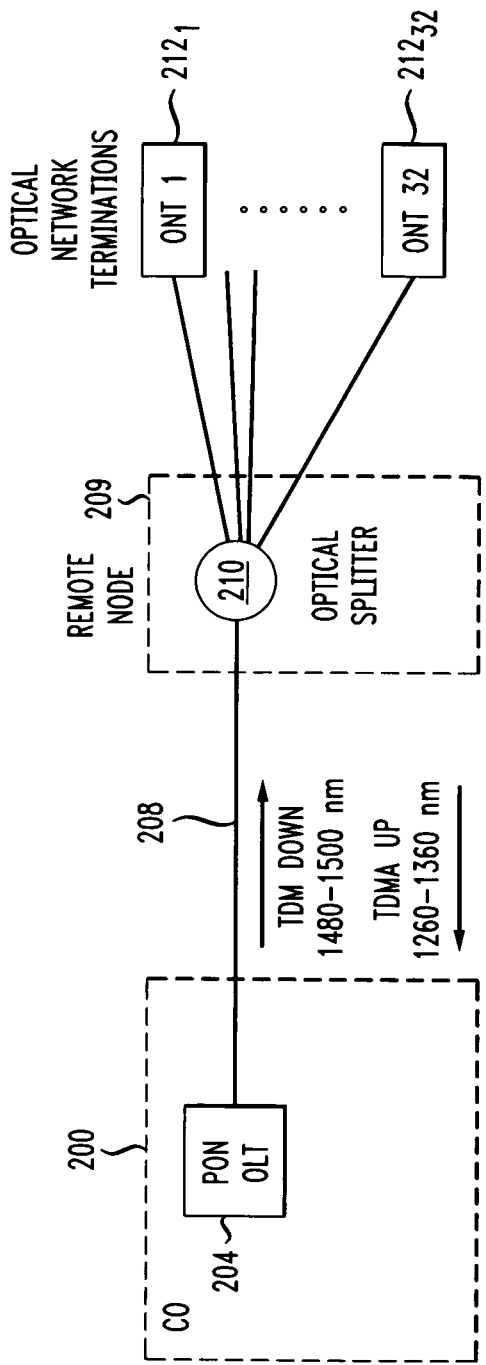
FIG. 2 is a schematic of another embodiment of an exemplary prior art GPON.
Figure 3:
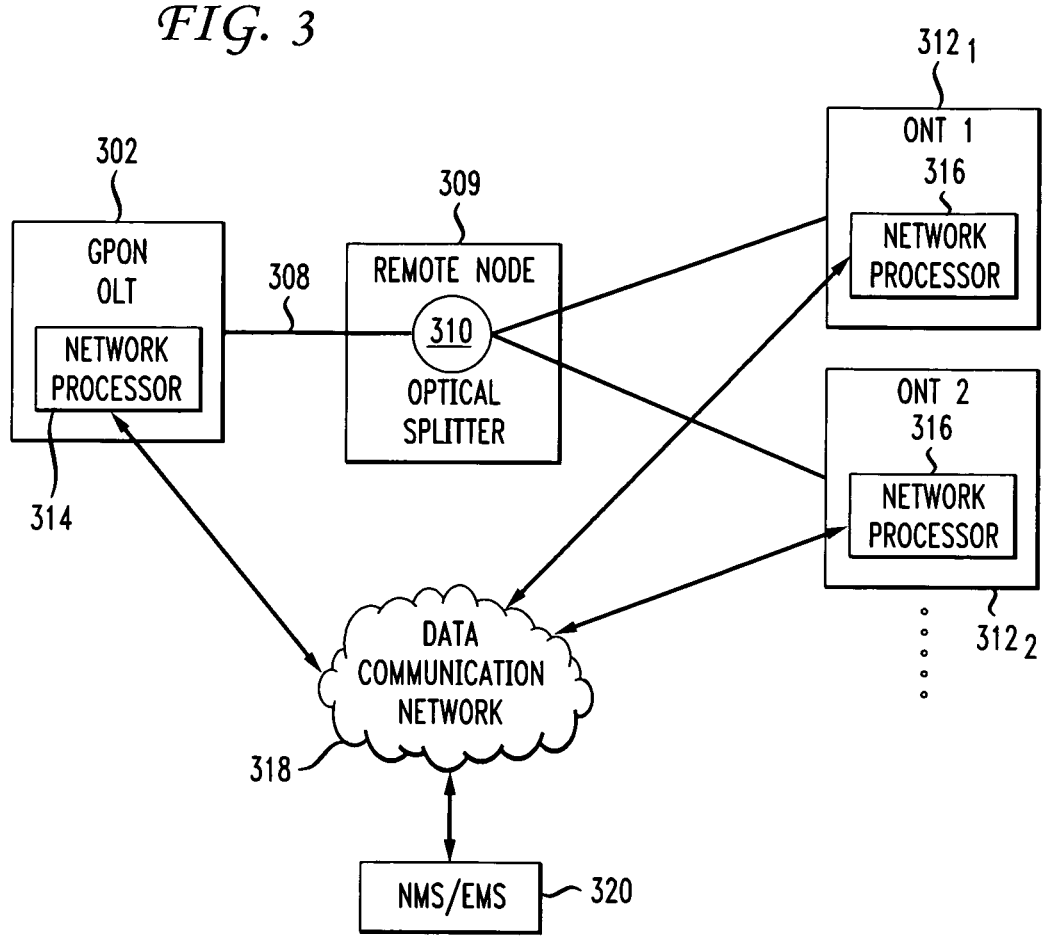
FIG. 3 is a schematic of an exemplary system in accordance with aspects of the invention.

FIG. 3 is a schematic of a system architecture 300 which includes a GPON OLT 302 that communicates via an optical distribution fiber 308 to a passive optical splitter 310 at remote node 309 as described above. A plurality of optical network terminals (ONT1, ONT2 . . . ) designated by the reference numerals $312_1$, $312_2$ are likewise coupled to splitter 310 at the remote node 309. The OLT 302 is operative as an optical transceiver for broadcasting data, video and voice to the ONTs, and receiving such data, video and voice from the ONTs. The OLT 302 includes a network processor 314 that comprises a processor and memory for storing application software and data utilized by the processor. Similarly, each ONT1, ONT2, . . . includes a network processor 316. The network processors 314, 316 implement the functionality of the OLT/ONTs, respectively. The OLT 302 and ONT1 $312_1$, ONT2 $312_2$, . . . communicate via a network management protocol, such as for example SNMP, over a data communications network shown generally at 318 with a Network Management System/Element Management System (NMS/EMS) 320. The network EMS portion of the NMS/EMS includes software that manages the OLTs and ONTs, and monitors OLT and ONT operating conditions through standard measurements that are acquired during normal operation.

Figure 4:
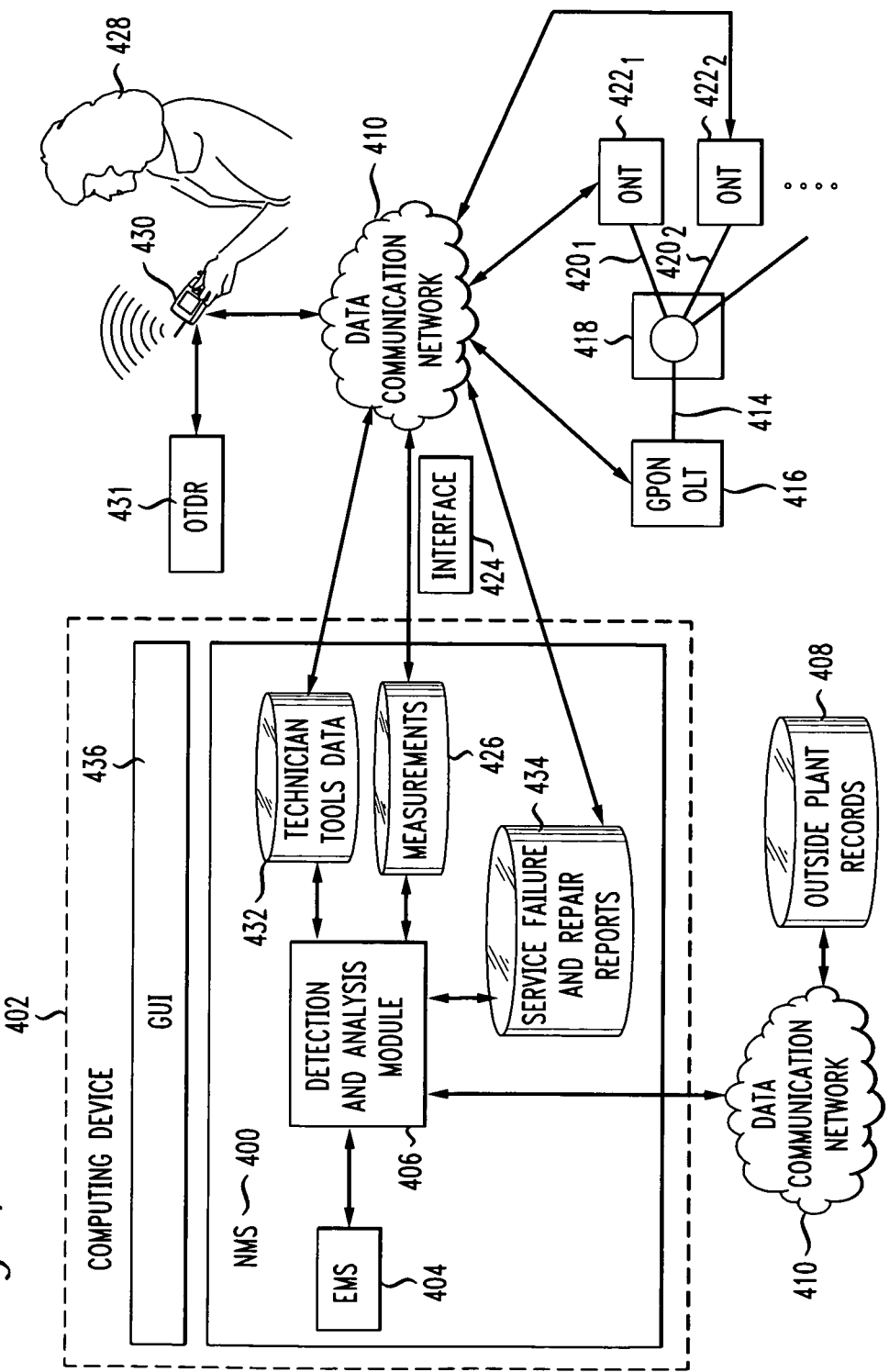
FIG. 4 is a schematic of an illustrative NMS architecture in accordance with aspects of the invention.

FIG. 4 is a schematic of an exemplary NMS 400 operating on a computing device 402 for implementing aspects of the invention. The components of the NMS 400 may comprise separate modules consisting of hardware, software, firmware and the like, as is well known in the art. The EMS portion is shown at 404 and may be of the type that is commonly employed in managing elements of optical networks. A detection and analysis module (DAM) 406 implements the functionality of the NMS 400 in accordance with aspects of the invention. The DAM 406 is adapted to receive data from an outside plant records database 408 via a data communications network 410 using SQL queries. The outside plant records database 408 includes information pertaining to each GPON's feeder segment 414 that couples an OLT 416 to a 1:N optical splitter 418, and N distribution fiber segments $420_1$, $420_2$, . . . from optical splitter 418 to the individual ONTs $422_1$, $422_2$, . . . . For each fiber segment, the following records and measurements are stored/updated in database 408: cable #, fiber #, type of fiber, location of splice points, length, connector type, loss at 1490 nm, loss at 1310 nm, ORL at 1490 nm, and ORL at 1310 nm.

Each OLT and ONT utilize their respective processors to make certain standardized measurements during normal operation such as: transmit power, receive power, laser bias current, temperature, voltage, frame errors, fiber length, error seconds, and FEC decoder statistics. These characteristics are communicated over data communication network 410 to the NMS 400 via a standard interface 424 such as TL1, SNMP, CORBA, TR-69 and/or OMCI, as is known in the art. The measurements received by the NMS 400 are stored in a database 426 in system memory.

Similarly, data ("technician tools data") acquired by a technician 428 who troubleshoots in the field may be transmitted to the system over data network 410 from a network access device 430. The technician tools data may include: optical time domain reflectometer (OTDR) data obtained from an OTDR 431, loss at 1490 nm, loss at 1310 nm, optical return loss (ORL) at 1490 nm, and ORL at 1310 nm. The OTDR 431 can upload the data directly to the network access device 430, or may be part of or include networking capabilities, in which case the OTDR 431 can upload the data to the NMS 400. The ORL can be determined using the OTDR 431 in a convention manner, or alternatively, by employing an ORL meter. This data is stored in database 432.

Service failures and repair reports may also be uploaded from a technician 428 to a database 434, and include data regarding each service visit to a customer site. Such data may include: day/time of trouble report, # tickets, verbal description of problem, and technician log during install & repair.

The detection and analysis module 406 executes on computing device 402 and utilizes the data stored in databases 408, 426, 432 and 434 in combination with running various analysis methods to make determinations regarding the condition of the GPON. Network management information for individual customers may be displayed for an operator/user on a graphic user interface (GUI) 436.

Figure 5:
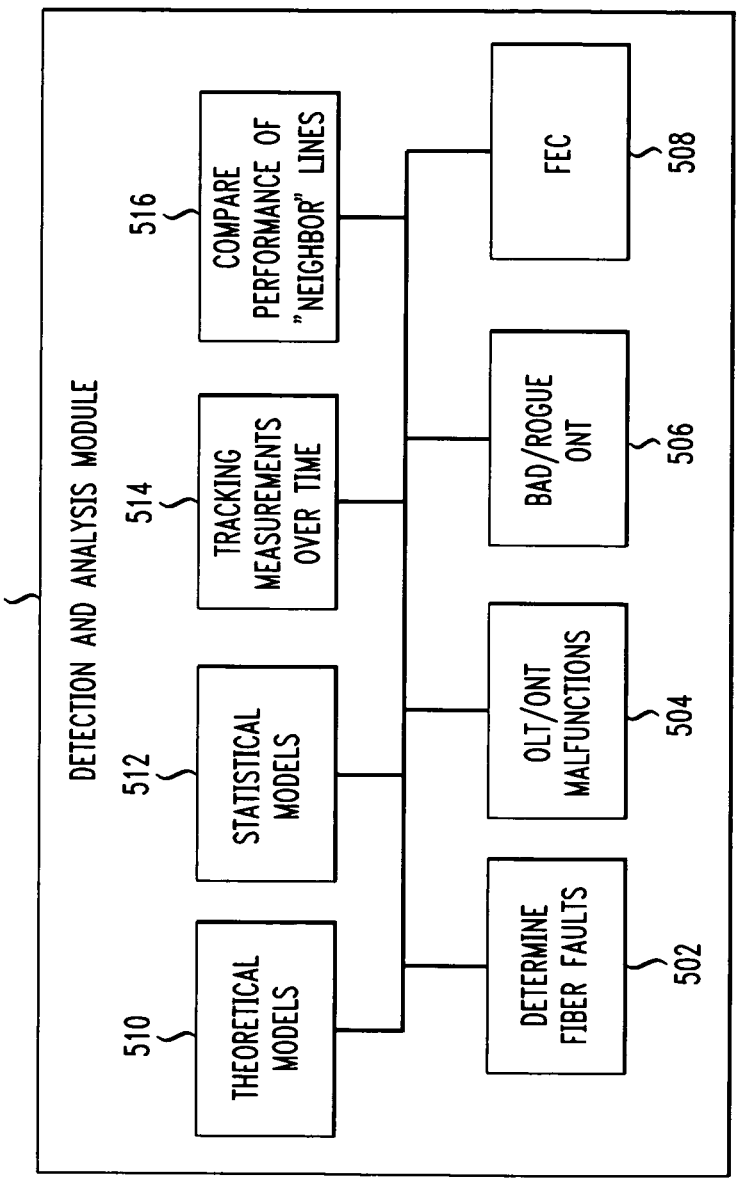
FIG. 5 is a schematic of a detection and analysis module in accordance with aspects of the present invention.

FIG. 5 is a block diagram of a DAM 500 that comprises a plurality of modules for implementing the functionality of the present invention. Utilizing the data retrieved from the various databases described above, the DAM employs a fiber fault/condition module 502 to determine various fiber conditions/faults, bends, splices, connectors. The DAM analyzes loss, OTDR, ORL and OLT/ONT transceiver measurements to determine cable #, fiber #, affected OLT/ONTs, distance to the fault and the like. Using these parameters, it can be determined for example, that if all ONTs in a PON are down, the fault is in the feeder fiber or optical splitter. If the OLT transmit power is normal, then the problem may be traced to the feeder segment. OLT/ONT transceiver malfunctions, calibration issues, ageing laser conditions, and the like may be determined by an OLT/ONT condition module 504. For example, a large drop in laser bias current, OLT/ONT transmit power, when correlated to bit or frame errors indicates a malfunction of the OLT/ONT. Overheating is identified by OLT/ONT condition module 504 by tracking the transceiver temperature, and laser ageing and imminent failure can be predicted by monitoring bias current increase over time. A bad/rogue ONT module 506 determines the existence of an ONT that transmits at the incorrect time, thus causing transmission collisions with other ONTs. The OLT can compare the received power to the expected power over time. Higher than expected power levels accompanied by a step increase in power may be due to a rogue ONT. This information is stored in the measurements database described above and illustrated in FIG. 4. A FEC module 508 estimates the bit error rate and if this exceeds some given threshold, applies FEC to the upstream or downstream transmission in accordance with techniques that are well known in the art. The effectiveness of the FEC can be monitored using the number of FEC corrected and uncorrectable codewords.

The DAM 500 comprises a theoretical model module 510 that employs theoretical models of fiber (signal) loss (connector loss, splicing losses, optical return loss (ORL), attenuation losses and the like), OTDR traces, laser and/or Light Emitting Diode (LED) ageing, and any differences between theory and measurements that cannot be explained by measurement error or variance as a result of a fault.

A statistics module 512 utilizes measurements from the network (PON, OLT and/or ONT, and subsystems), groups them with similar deployment scenarios, and compares actual data statistically to identify outliers.

Measurement over time module 514 detects problems by collecting data points periodically and comparing the data at different sampling points. Variation that cannot be explained due to measurement error or normal variation of the measurements is likely due to a fault.

Compare to neighbor module 516 compares an ONT's performance with neighboring ONTs in the PON to identify any outliers. A "neighborhood" is typically defined as all ONTs on the same PON, as they will likely show a synchronized movement in measurement data.

Figure 6:
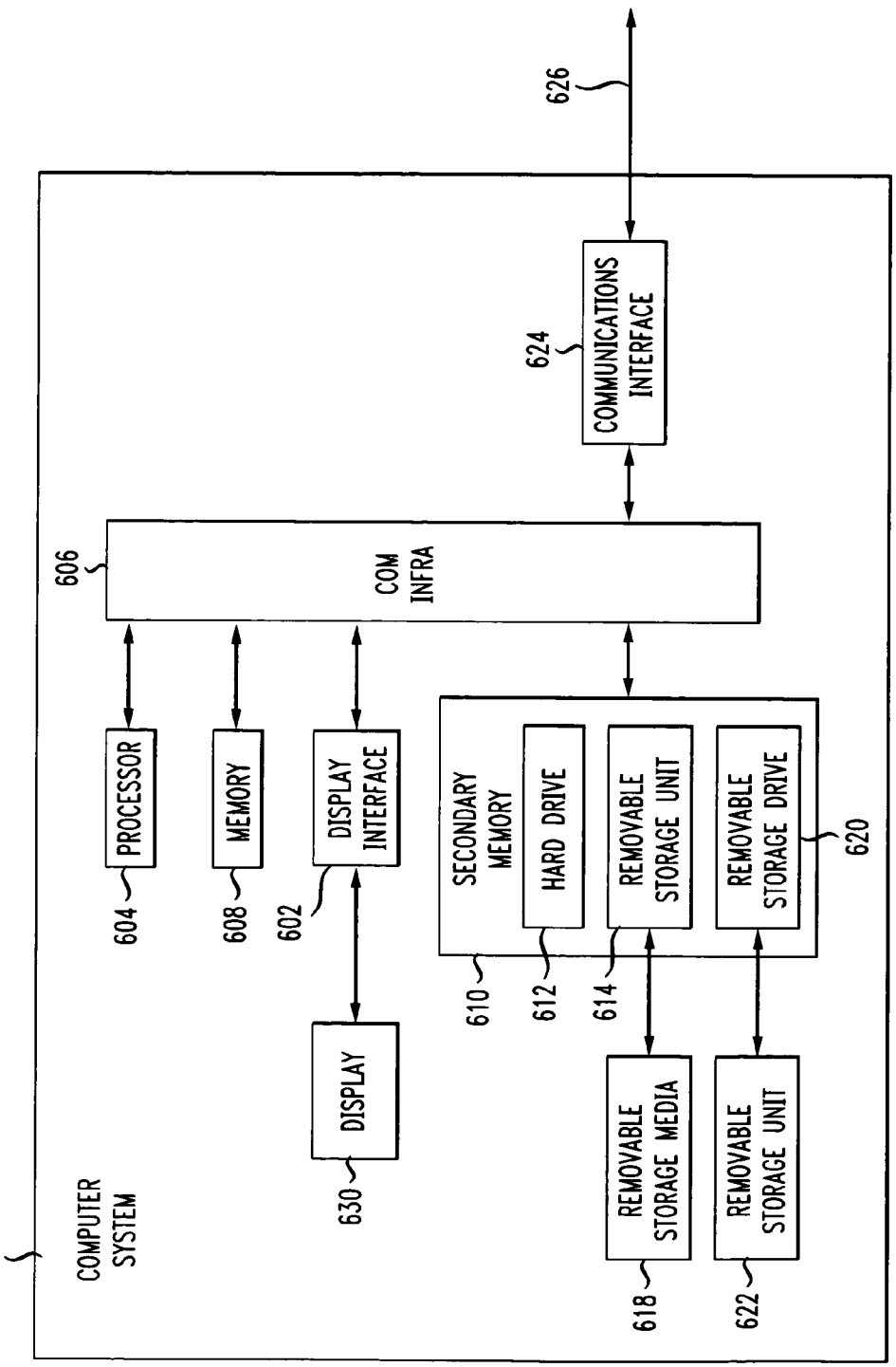
FIG. 6 is a schematic of an exemplary computing device for implementing the NMS in accordance with aspects of the present invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 600 is shown in FIG. 6. Computer system 600 includes one or more processors, such as processor 604. Processor 604 is connected to a communication infrastructure 606 (e.g., a communications bus, cross-over bar, or network). Computer system 600 can include a display interface 602 (e.g. a graphics card) that allows graphics, text, and other data from the communication infrastructure 606 (or from a frame buffer not shown) to be displayed on a display unit 630. Computer system 600 also includes a main memory 608, preferably random access memory (RAM), and may also include a secondary memory 610. The secondary memory 610 may include, for example, a hard disk drive 612 and/or a removable storage drive 614. The removable storage drive 614 has read/write functionality onto removable storage media 618 having stored therein computer software and/or data. In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600. Computer system 600 may also include a communications interface 624 allowing software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals (not shown), which may be electronic, electromagnetic, optical or other signals capable of being received by communications interface 624. These signals are provided to communications interface 624 via a communications path (e.g., channel) 626. This path 626 carries the signals and may be implemented using wire or cable, fiber optics, a telephone line, a cellular link, a radio frequency (RF) link and/or other communications channels. Computer programs (also referred to as computer control logic) are stored in main memory 608 and/or secondary memory 610. Computer programs may also be received via communications interface 624. Computer programs, when executed, enable the computer system 600 to perform the features of the present invention, as discussed herein. Accordingly, such computer programs represent controllers of the computer system 600. In an embodiment where the invention is implemented using software, the software may be stored in a computer program product and loaded into computer system 600 using removable storage drive 614, hard drive 612, or communications interface 624. The control logic (software), when executed by the processor 604, causes the processor 604 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s). In one exemplary embodiment, the system for the present invention may be implemented, for example, as a Microsoft.net® desktop application program (Microsoft.net® is made by Microsoft® Corporation of Redmond, Wash.), which may reside on a computer hard drive, database or other repository of data, or be uploaded from the Internet or other network (e.g., from a PC, minicomputer, mainframe computer, microcomputer, telephone device, PDA, or other NAD having a processor and input and/or output capability). Any available software tool capable of implementing the concepts described herein may be used to implement the system and method of the present invention. The method and system of the present invention may also be implemented as an application-specific add-on to a program, or as a standalone application.

Referring now to FIG. 7, there is depicted an illustrative flowchart of a high-level process for implementing the present invention. In step 700, the NMS receives measurements made by the OLT/ONTs in the PON. In step 702, the NMS stores these measurements in a database. If there are any technician tools data at 704, then such data is uploaded over a communications network and stored in a database at step 706. If there are service failure/repair reports at 708, then such service failure and repair report data is uploaded over the network and stored in a database at step 710. At step 712, the NMS correlates the data and utilizes at least one of the methodologies described above, including comparison to theoretical models, statistical methods, tracking measurements over time, and/or comparison to neighboring components. At block 714, any fiber faults, including faulty bends, connectors and splices are identified. At block 716, any splitter failures are identified. At block 718, any OLT issues are identified. At block 720, any ONT issues are identified. At block 722, FEC is implemented and applied to upstream and downstream transmissions between the OLT and the ONTs.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. An apparatus comprising:
a memory storing computer program instructions;
a processor communicatively coupled to the memory, the processor to execute the computer program instructions, which, when executed on the processor, cause the processor to perform operations comprising:
receiving uploaded measurement data from an optical line terminal and an optical network terminal, and technician data associated with the optical line terminal and the optical network terminal; and predicting, based on monitoring bias increase over time, an imminent failure in the passive optical network, by correlating the uploaded measurement data and the technician data with information stored in a memory medium for the optical line terminal and the optical network terminal.

2. The apparatus of claim 1, further comprising comparing the uploaded measurement data and the technician data to theoretical models.

3. The apparatus of claim 1, further comprising grouping the uploaded measurement data and the technician data and statistically analyzing the uploaded measurement data and the technician data.

4. The apparatus of claim 1, further comprising collecting the uploaded measurement data and the technician data periodically and comparing the uploaded measurement data and the technician data at different sampling points.

5. The apparatus of claim 1, further comprising comparing the uploaded measurement data and the technician data from the optical network terminal to other optical network terminals connected to the optical line terminal.

6. The apparatus of claim 1, further comprising displaying the imminent failure on a graphic user interface.

7. A computerized method for managing a passive optical network, comprising:
receiving uploaded measurement data from an optical line terminal and an optical network terminal, and technician data associated with the optical line terminal and the optical network terminal; and
predicting, based on monitoring bias increase over time, an imminent failure in the passive optical network over time, by correlating the uploaded measurement data and the technician data with information stored in a memory medium for the optical line terminal and the optical network terminal; and
displaying the imminent failure on a graphic user interface.

8. The method of claim 7, further comprising comparing the uploaded measurement data and the technician data to theoretical models.

9. The method of claim 7, further comprising grouping the uploaded measurement data and the technician data and statistically analyzing the uploaded measurement data and the technician data.

10. The method of claim 7, further comprising collecting the uploaded measurement data and the technician data periodically and comparing the uploaded measurement data and the technician data at different sampling points.

11. The method of claim 7, further comprising comparing the uploaded measurement data and the technician data from the optical network terminal to other optical network terminals connected to the optical line terminal.

12. A machine-readable medium containing computer encoded instructions stored thereon which, when executed by a processor, enable a device to manage a passive optical network, by performing operations comprising:
receiving uploaded measurement data from an optical line terminal and an optical network terminal, and technician data associated with the optical line terminal and the optical network terminal;
predicting, based monitoring bias increase over time, an imminent failure in the passive optical network, by correlating the uploaded measurement data and the technician data with information stored in a memory medium for the optical line terminal and the optical network terminal; and
displaying the imminent failure on a graphic user interface.

13. The machine-readable medium of claim 12, further comprising computer encoded instructions stored thereon which, when executed by a processor, enable a device to manage a passive optical network, by performing operations comprising:
comparing the uploaded measurement data and the technician data to theoretical models.

14. The machine-readable medium of claim 12, further comprising computer encoded instructions stored thereon which, when executed by a processor, enable a device to manage a passive optical network, by performing operations comprising:

grouping the uploaded measurement data and the technician data and statistically analyzing the uploaded measurement data and the technician data.

15. The machine-readable medium of claim 12, further comprising computer encoded instructions stored thereon which, when executed by a processor, enable a device to manage a passive optical network, by performing operations comprising:

collecting the uploaded measurement data and the technician data periodically and comparing the uploaded measurement data and the technician data at different sampling points.

16. The machine-readable medium of claim 12, further comprising computer encoded instructions stored thereon which, when executed by a processor, enable a device to manage a passive optical network, by performing operations comprising:

comparing the uploaded measurement data and technician data from the optical network terminal to other optical network terminals connected to the optical line terminal.

17. The system of claim 1, wherein the technician data comprises at least one of technical tools data, service failure data, and outside plant data.

18. The method of claim 7, wherein the technician data comprises at least one of technical tools data, service failure data, and outside plant data.

19. The machine-readable medium of claim 12, wherein the technician data comprises at least one of technical tools data, service failure data, and outside plant data.

* * * * *